(12) United States Patent
Kanevsky et al.

(10) Patent No.: US 8,484,023 B2
(45) Date of Patent: Jul. 9, 2013

(54) SPARSE REPRESENTATION FEATURES FOR SPEECH RECOGNITION

(75) Inventors: Dimitri Kanevsky, Ossining, NY (US); David Nahamoo, Great Neck, NY (US); Bhuvana Ramabhadran, Mt. Kisco, NY (US); Tara N. Sainath, New York, NY (US)

(73) Assignee: Nuance Communications, Inc., Burlington, MA (US)

( * ) Notice: Subject to any disclaimer, the term of this patent is extended or adjusted under 35 U.S.C. 154(b) by 310 days.

(21) Appl. No.: 12/889,845

(22) Filed: Sep. 24, 2010

(65) Prior Publication Data

US 2012/0078621 A1 Mar. 29, 2012

(51) Int. Cl.
*G10L 15/06* (2006.01)

(52) U.S. Cl.
USPC ............... 704/243; 704/256.2; 704/256.3

(58) Field of Classification Search
USPC ............ 704/236, 238, 243, 256.2, 256.3
See application file for complete search history.

(56) References Cited

U.S. PATENT DOCUMENTS 5,469,529 A 11/1995 Bimbot et al.
5,640,487 A * 6/1997 Lau et al. .................. 704/243
7,054,810 B2 * 5/2006 Gao et al. .................. 704/231
7,240,042 B2 * 7/2007 Cheng et al. ................ 706/52
7,502,737 B2 3/2009 Sharma (Continued)

FOREIGN PATENT DOCUMENTS

WO WO2004064040 A1 7/2004

OTHER PUBLICATIONS

Sainath et al., "Bayesian Compressive Sensing for Phonetic Classification", 2010 IEEE International Conference on Acoustics, Speech, and Signal Processing, Mar. 14-19, 2010, pp. 4370 to 4373.*

(Continued)

*Primary Examiner* — Martin Lerner
(74) *Attorney, Agent, or Firm* — Sunstein Kann Murphy & Timbers LLP (57) ABSTRACT

Techniques are disclosed for generating and using sparse representation features to improve speech recognition performance. In particular, principles of the invention provide sparse representation exemplar-based recognition techniques. For example, a method comprises the following steps. A test vector and a training data set associated with a speech recognition system are obtained. A subset of the training data set is selected. The test vector is mapped with the selected subset of the training data set as a linear combination that is weighted by a sparseness constraint such that a new test feature set is formed wherein the training data set is moved more closely to the test vector subject to the sparseness constraint. An acoustic model is trained on the new test feature set. The acoustic model trained on the new test feature set may be used to decode user speech input to the speech recognition system.

25 Claims, 2 Drawing Sheets

U.S. PATENT DOCUMENTS

| | | |
|---|---|---|
| 7,676,371 B2 | 3/2010 | Cross, Jr. et al. |
| 8,195,734 B1 * | 6/2012 | Long et al. ............ 708/520 |
| 8,326,787 B2 * | 12/2012 | Asadi et al. ............ 706/45 |
| 2005/0119885 A1 * | 6/2005 | Axelrod et al. ............ 704/231 |
| 2008/0312921 A1 * | 12/2008 | Axelrod et al. ............ 704/240 |
| 2009/0276216 A1 * | 11/2009 | Amini et al. ............ 704/236 |
| 2010/0250556 A1 * | 9/2010 | Park et al. ............ 707/749 |
| 2011/0054853 A1 * | 3/2011 | Asadi et al. ............ 703/2 |
| 2011/0064302 A1 * | 3/2011 | Ma et al. ............ 382/159 |
| 2011/0282925 A1 * | 11/2011 | Kanevsky et al. ............ 708/207 |
| 2012/0078834 A1 * | 3/2012 | Sainath et al. ............ 706/50 |
| 2012/0221333 A1 * | 8/2012 | Kanevsky et al. ............ 704/243 |

OTHER PUBLICATIONS

Y. Zhao et al., "A Speaker-Independent Continuous Speech Recognition System Using Continuous Mixture Gaussian Density HMM of Phoneme-Sized Units," IEEE Transactions on Speech and Audio Processing, Jul. 1993, pp. 345-361, vol. 1, No. 3.

A. Carmy et al., "ABCS: Approximate Bayesian Compressed Sensing" IBM Research Report, RC24816 (W0906-115), Jun. 2009, 17 pages.

* cited by examiner

SPARSE REPRESENTATION FEATURES FOR SPEECH RECOGNITION

FIELD OF THE INVENTION

The present invention generally relates to speech recognition and, more particularly, to techniques for generating and using sparse representation features to improve speech recognition performance.

BACKGROUND OF THE INVENTION

It is known that Gaussian Mixture Models (GMMs) continue to be extremely popular for recognition-type problems in speech. While GMMs allow for fast model training and scoring, training samples are pooled together for parameter estimation, resulting in a loss of information that exists within individual training samples.

At the other extreme, exemplar-based techniques utilize information about actual training examples. While exemplar-based methods have been shown to offer improvements in accuracy over GMMs for classification tasks, this is not the case with recognition tasks. As is known, speech classification is the task of classifying a speech signal as a given class or type from among a given set of classes or types known a priori, while speech recognition is the task of decoding the speech signal to generate recognition results. It is to be understood though that speech classification can be performed in the speech recognition task but, in such case, classes or types are typically not known a priori.

SUMMARY OF THE INVENTION

Principles of the invention provide techniques for generating and using sparse representation features to improve speech recognition performance. In particular, principles of the invention provide sparse representation exemplar-based recognition techniques.

For example, in one aspect, a method comprises the following steps. A test vector and a training data set associated with a speech recognition system are obtained. A subset of the training data set is selected. The test vector is mapped with the selected subset of the training data set as a linear combination that is weighted by a sparseness constraint such that a new test feature set is formed wherein the training data set is moved more closely to the test vector subject to the sparseness constraint. An acoustic model is trained on the new test feature set. The acoustic model trained on the new test feature set may be used to decode user speech input to the speech recognition system.

Advantageously, by moving the training data set more closely to the test vector subject to the sparseness constraint, speech recognition performance is improved, e.g., frame accuracy, word error rate, etc.

These and other objects, features, and advantages of the present invention will become apparent from the following detailed description of illustrative embodiments thereof, which is to be read in connection with the accompanying drawings.

DETAILED DESCRIPTION OF PREFERRED EMBODIMENTS

Principles of the present invention will be described herein in the context of illustrative embodiments of methods, apparatus, articles of manufacture, and systems for providing speech recognition functions. It is to be appreciated, however, that the principles of the present invention are not limited to the specific methods, apparatus, articles of manufacture, and systems illustratively shown and described herein. Rather, the principles of the invention are directed broadly to speech recognition techniques whereby improved recognition performance is attained via the generation and use of sparse representation features in an exemplar-based training approach. For this reason, numerous modifications can be made to the embodiments shown that are within the scope of the present invention. That is, no limitations with respect to the specific embodiments described herein are intended or should be inferred.

It is realized that the lack of success of existing exemplar-based methods for recognition tasks can be attributed to the following reasons. First, characterizing a test sample by searching over a large amount of training data (for example, typically greater than about 50 hours for large vocabulary) is more computationally expensive relative to evaluating a set of Gaussian mixtures. Second, in both classification and recognition, the goal is to determine classes that best represent the test samples. In classification, the segments associated with each class are known ahead of time, and thus decision scores can directly be calculated for each segment using exemplar-based techniques. In recognition, class boundaries are not known beforehand, and thus must be determined via a dynamic programming approach (e.g., Hidden Markov Models or HMMs). This requires estimating class probabilities that can be compared across frames, something which existing exemplar-based methods cannot easily do.

In accordance with illustrative principles of the invention, a sparse representation exemplar-based training methodology is provided for creating a new set of features while utilizing the benefits of HMMs to efficiently compare scores across frames. This is in contrast to existing exemplar-based methods which try to utilize the decision scores from the exemplar-based classifiers themselves to generate probabilities.

In one sparse representation (SR) embodiment of the invention, as will be explained below in detail below, given a test vector and a set of exemplars from a training data set, we represent the test vector as a linear combination of training examples by solving for a given feature subject to a given sparseness constraint. The given feature can be considered as a mapping of the test vector back into the linear span of the training examples. An illustrative embodiment of a sparse representation exemplar-based training methodology which generates such a feature will be described below in the context of FIG. 2.

Figure 1A:
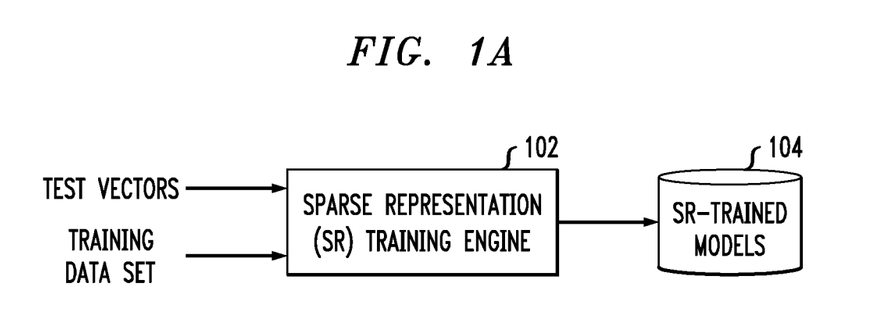
FIG. 1A illustrates a sparse representation training system according to an embodiment of the invention.

Referring initially to FIG. 1A, a sparse representation training system is illustrated according to an embodiment of the invention. As shown, sparse representation (SR) training engine 102 receives one or more test vectors and a training data set. The engine 102 then employs a sparse representation exemplar-based training methodology, as will be explained in detail below, to yield SR-trained acoustic models. The models can be stored in storage 104.

As is known, training data is generally understood to be speech data that is used to initially train the acoustic models, typically in a non-real-time (offline) process. Test data is generally understood to be speech data that is provided to the speech recognition system during real-time (online) decoding or recognition.

Figure 1B:
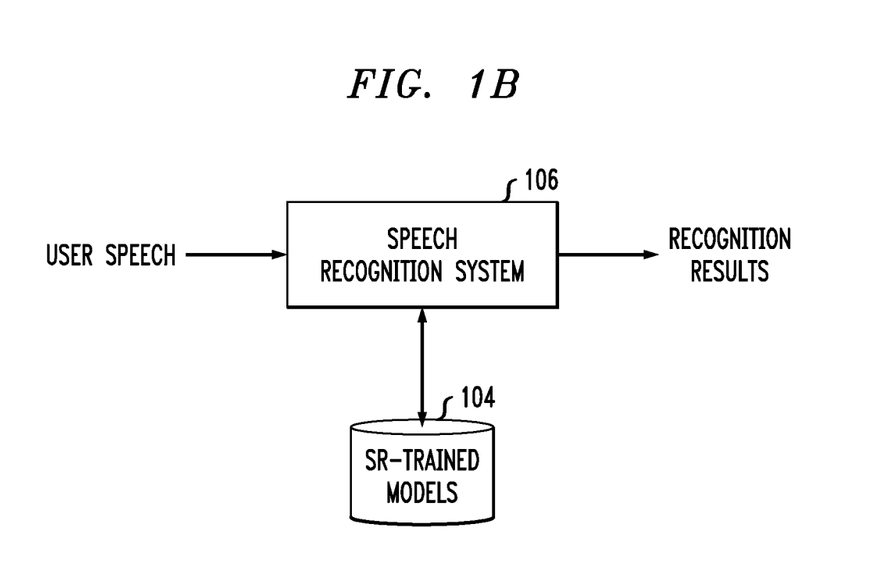
FIG. 1B illustrates a speech recognition system according to an embodiment of the invention.

FIG. 1B illustrates a speech recognition system according to an embodiment of the invention. It is to be understood that the speech recognition system 106 utilizes the SR-trained acoustic models stored in storage 104 (and generated in accordance with the training engine, 102 in FIG. 1A) to decode user speech input to the system 106. This is the actual decoding or recognition task whereby the user's speech is input and decoded to generate a transcription (i.e., recognition results) that represents the input speech. It is realized that improved recognition performance is attained via the generation and use of sparse representation features in an exemplar-based training approach according to embodiments of the invention.

While not specifically shown, it is understood that speech recognition system 106 may include front-end processing components such as a speech utterance pre-processor and a feature extractor. The speech utterance pre-processor receives the user speech, typically in the form of testing or real-time utterances, and generates representative speech waveforms (i.e., a speech signal). The speech utterance pre-processor may include, for example, an audio transducer (e.g., a microphone) and a digital-to-analog converter which respectively operatively transforms the received utterance into an analog electrical signal, and then preferably converts the analog signal into a digital signal representation of the received utterance. Further, the speech utterance pre-processor may sample the speech signal at predetermined intervals and partition the signal into overlapping frames so that each frame can be discretely processed by the remainder of the system. The output signal from the speech utterance pre-processor is the sampled speech waveform or speech signal which is preferably recorded and presented to the feature extractor.

The feature extractor receives the speech signal and, as is known in the art, extracts cepstral features from the signal at predetermined (e.g., periodic) intervals, such as, for example, every ten milliseconds. The cepstral features are preferably in the form of speech or feature vectors (signals). Feature vectors associated with at least a portion of the real-time speech utterances are output by the feature extractor and passed on to a speech recognition engine, which uses the SR-trained acoustic models to decode the speech data received during the course of a real-time application (user speech) to generate the recognition results.

Figure 2:
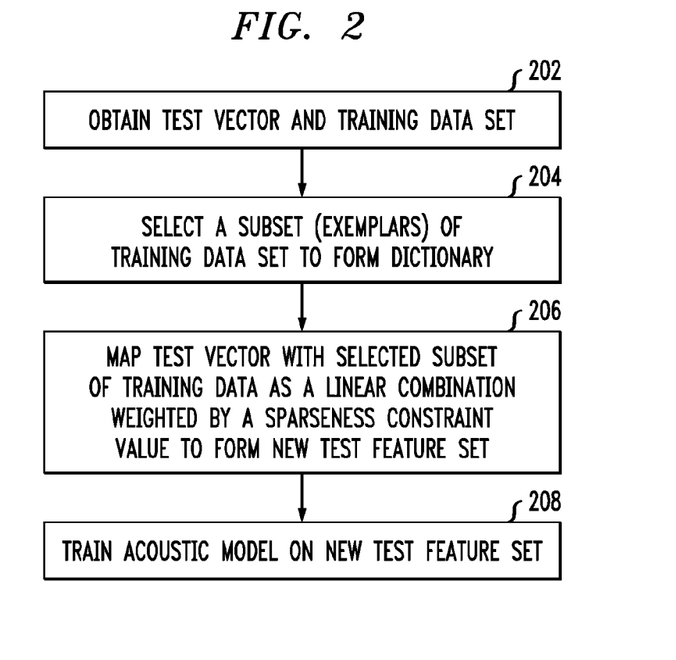
FIG. 2 illustrates a sparse representation exemplar-based training methodology according to an embodiment of the invention.

Turning now to a description of a sparse representation (SR) exemplar-based training methodology according to the invention, FIG. 2 illustrates one embodiment of such a sparse representation exemplar-based training methodology.

The methodology 200 begins at step 202 wherein a test vector and a training data set are obtained.

In step 204, a subset of the training data set is selected to form a dictionary. The subset of the training data set may be referred to as exemplars.

In step 206, the test vector is mapped with the selected subset of the training data set as a linear combination that is weighted by a sparseness constraint value. The mapping forms a new test feature set. In accordance with this new test feature set, the training data is moved more closely to the test data subject to some predetermined degree of sparseness.

In step 208, the acoustic model(s) used by the speech recognition system are trained on the new feature set. As explained above, these SR-trained acoustic models are then used by the speech recognition engine to decode input user speech with improved recognition performance.

For example, given a test vector y and a set of exemplars $h_i$ from the training set, which are put into a dictionary $H=[h_1; h_2 \ldots ; h_n]$, we represent y as a linear combination of training examples by solving $y=H\beta$ subject to a sparseness constraint on $\beta$. The feature $H\beta$ can be thought of as mapping test sample y back into the linear span of training examples in H (step 206 in FIG. 2). We have proven that the frame classification accuracy is higher for the SR method compared to a GMM, wherein not only does the $H\beta$ representation move test features closer to training, but it also moves these features closer to the correct class. Given these new set of $H\beta$ features, we train up an HMM (i.e., SR-trained acoustic models 104) on these features and perform recognition (i.e., in speech recognition system 106).

To create a set of SR features, first, let us consider taking all training examples $n_i$ from class i and concatenate them into a matrix $H_i$ as columns, i.e., $H_i=[x_{i,1}, x_{i,2}, \ldots, x_{i,n_i}]\in R^{m\times n_i}$, where $x\in R^m$ represents a feature vector from the training set of class i with dimension m. Given sufficient training examples from class i, a test sample $y\in R^m$ from the same class can be represented as a linear combination of the entries in $H_i$ weighted by $\beta$, that is:

$$y=\beta_{i,1}x_{i,1}+\beta_{i,2}x_{i,2}+\ldots+\beta_{i,n_i}x_{i,n_i} \qquad (1)$$

However, since the class membership of y is unknown, we define a matrix H to include training examples from k different classes in the training set, i.e., the columns of H are defined as $H=[H_1, H_2, \ldots, H_k]=[x_{1,1}, x_{1,2}, \ldots, x_{k,n_k}]\in R^{m\times N}$. Here m is the dimension of each feature vector x and N is the total number of all training examples from all classes. H can be thought of as an over-complete dictionary where $m\ll N$. We can then write test vector y as a linear combination of all training examples, i.e., $y=H\beta$. Ideally, the optimal $\beta$ should be sparse, and only be non-zero for the elements in H which belong to the same class as y. Thus, ideally, y will assign itself to lie in the linear span of examples from the training set of the true class to which it belongs. For example, assume that H is comprised of features from five classes and y belongs to class 0. Then, the $\beta$ values in H corresponding to class 0 will be high and the other $\beta$ values belonging to incorrect classes will be close to zero.

Thus, in accordance with an embodiment of the invention, we solve the problem $y=H\beta$ subject to a sparseness constraint on $\beta$. It is to be appreciated that the sparseness constraint on $\beta$ acts as a regularization term to prevent over-fitting, and often allows for better classification performance than without sparseness.

Various SR methods can be used to solve for $\beta$. For example, those skilled the art will appreciate that various methods, such as the Lasso method, the Elastic Net method, the Dantzig selector method, the OMP method, and the Cosamp method, can be used to compute $\beta$. In accordance with an embodiment of the invention, we solve for $\beta$ using an approximate Bayesian compressive sensing (ABCS) method which imposes a combination of an $l_1$ and $l_2$ regularization on $\beta$.

In the ABCS method, we use CS (compressive sensing) to solve the following problem:

$$y=H\beta s.t. \|\beta\|_1^2 < \delta \text{ for } \beta \qquad (2)$$

Here $\|\beta\|_1^2 < \delta$ denotes a sparseness-promoting semi-gaussian constraint, which we will describe in more detail below. In addition, y is a frame of data from the test set such that $y\in R^m$ where m is the dimension of the feature vector y. H is a matrix of training examples and $H\in R^{m\times n}$ where $m\ll n$. We assume that y satisfies a linear model as: $y = H\beta + \zeta$ where $\zeta \sim N(0,R)$. This allows us to represent $p(y|\beta)$ as a Gaussian distribution as:

$$p(y|\beta) \mu \exp(-\tfrac{1}{2}(y-H\beta)^T R^{-1}(y-H\beta)) \quad (3)$$

Assuming $\beta$ is a random parameter with some prior $p(\beta)$, we can obtain the maximum a posteriori (MAP) estimate for $\beta$ given y as follows: $\beta^* = \arg\max_\beta p(\beta|y) = \max_\beta p(y|\beta) p(\beta)$. In the ABCS formulation, we assume that $p(\beta)$ is actually the product of two prior constraints, namely a gaussian constraint $p_G(\beta)$ and a semi-gaussian constraint $p_{SG}(\beta)$. Below, we present a two-step solution to solve the following problem in the ABCS framework.

$$\beta^* = \underset{\beta}{\operatorname{argmax}}\, p(y|\beta) p_G(\beta) p_{SG}(\beta) \quad (4)$$

In step 1, we solve for the $\beta$ which maximizes the following expression. Equation 5 is equivalent to solving the equation $y = H\beta$ without enforcing a sparseness constraint on $\beta$.

$$\beta^* = \underset{\beta}{\operatorname{argmax}}\, p(y|\beta) p_G(\beta) \quad (5)$$

We assume that $p_G(\beta)$ is a Gaussian, i.e., $p_G(\beta) = N(\beta|\beta_0, P_0)$. Here $\beta_0$ and $P_0$ are initialized statistical moments utilized in the algorithm. It can be proven that the solution to Equation 5 has a closed form solution given by Equation 6.

$$\beta^* = \beta_1 (I - P_0 H^T (H P_0 H^T + R)^{-1} H)\beta_0 + P_0 H^T (H P_0 H^T + R)^{-1} y \quad (6)$$

Similarly, we can express the variance of $\beta_1$ as $P_1 = E[(\beta - \beta^1)(\beta - \beta^1)^T]$, given more explicitly by Equation 7.

$$P_1 = (I - P_0 H^T (H P_0 H^T + R)^{-1} H) P_0 \quad (7)$$

Step 1 essentially solved for the pseudo-inverse of $y = H\beta$, of which there are many solutions. In step 2, we impose an additional constraint that $\beta$ will have a sparseness-promoting semi-Gaussian prior, as given by Equation 8. Here $\sigma^2$ is a constant parameter which controls the degree of sparseness of $\beta$.

$$p_{SG}(\beta) = \exp\left(-\frac{\|\beta\|_1^2}{2\sigma^2}\right) \quad (8)$$

Given the solutions to step 1 in Equations 6 and 7, we can simply rewrite Equation 5 as another gaussian as $p'(\beta|y) = p(y|\beta) p_G(\beta) = N(\beta|\beta_1, P_1)$. Therefore, let us assume now that we would like to solve for the MAP estimate of $\beta$ given the constraint that it is semi-gaussian, in other words:

$$\beta^* = \underset{\beta}{\operatorname{argmax}}\, p'(\beta|y) p_{SG}(\beta) \quad (9)$$

In order to represent $p_{SG}(\beta)$ as a Gaussian the same way that $p(y|\beta)$ in Equation 3 was represented, let us define $\beta^i$ to be the $i^{th}$ entry of the vector $\beta$. We introduce a matrix $\hat{H}$ of which the entries are set as $\hat{H}^i(\beta^i) = \text{sign}(\beta^i)$, for $i = 1, \ldots, n$. Here $\hat{H}^i(\beta^i) = +1$ for $\beta^i > 0$, $\hat{H}^i(\beta^i) = -1$ for $\beta^i < 0$, and $\hat{H}^i(\beta^i) = 0$ for $\beta^i = 0$. This matrix $\hat{H}$ is motivated from the fact that:

$$\|\beta\|_1^2 = \left(\sum_i |\beta^i|\right)^2 = \left(\sum_i (\hat{H}^i(\beta^i)\beta^i)\right)^2 = (\hat{H}\beta)^2 \quad (10)$$

Substituting the expression for $\|\beta\|_1^2$ given in Equation 10 and assuming that $y = 0$, we can rewrite Equation 8 as Equation 11. Notice that Equation 11 has the same form as Equation 3 with H and R now replaced by $\hat{H}$ and $\sigma$ respectively.

$$p_{SG}(\beta) = p(y = 0|\beta) = \exp\left(\frac{-(0 - \hat{H}\beta)^2}{2\sigma^2}\right) \quad (11)$$

The only issue with using Equation 9 to solve for $\beta$ is the dependency of $\hat{H}$ on $\beta$ in Equation 6. Therefore, we make an assumption, by calculating $\hat{H}$ based on the sign of the previously estimated $\beta$. In other words, $\hat{H}^i(\beta^i) \approx \hat{H}^i(\beta_{k-1}^i)$. With this approximation, we can use Equations 6 and 7 to solve Equation 11. However, because of this semi-gaussian approximation, we must estimate $\beta$ and P iteratively. This iteration also requires that we set $\sigma^2$ as $\rho^2 \times d$ where d is the total number of iterations of step 2. Equation 12 gives the recursive formula which solves Equation 9 at iteration k for $k > 1$ to d. Note that $p'(\beta|y) = N(\beta|\beta_{k-1}, P_{k-1})$.

$$\beta_k = \beta_{k-1} - \frac{P_{k-1}\hat{H}^T}{\hat{H} P_{k-1}\hat{H}^T + d \times \sigma^2} \hat{H} \beta_{k-1} \quad (12)$$

$$P_k = \left[I - \frac{P_{k-1}\hat{H}^T}{\hat{H} P_{k-1}\hat{H}^T + d \times \sigma^2}\right] P_{k-1} \quad (13)$$

It can be shown that for large $\sigma^2$ and large k, the estimate of $\beta$ and P using the approximate semi-gaussian given in Equation 11 is bounded from the estimate of these parameters for the true semi-gaussian given in Equation 8 by $O(1/\sigma^2$.

It is to be appreciated that a speech signal is defined by a series of feature vectors, $Y = \{y^1, y^2 \ldots y^n\}$, for example Mel-Scale Frequency Cepstral Coefficients (MFCCs). For every test sample $y^t \in Y$, we choose an appropriate $H^t$ and then solve $y^t = H^t \beta^t$ to compute a $\beta^t$ via ABCS. Then, given this $\beta^t$, a corresponding $H^t \beta^t$ vector is formed. Thus, a series of $H\beta$ vectors is created at each frame as $\{H^1 \beta^1, H^2 \beta^2 \ldots H^n \beta^n\}$. The sparse representation features are created for both training and test. An HMM is then trained given this new set of features and recognition is performed in this new feature space.

Now that we have described an illustrative method to solve for $\beta$, given y and H, we now discuss how to measure the quality of how well the test vector y is mapped back into the linear span of training examples in H. We can measure how well y assigns itself to different classes in H by looking at the residual error between y and the $H\beta$ entries corresponding to a specific class. Ideally, all non-zero entries of $\beta$ should correspond to the entries in H with the same class as y and the residual error will be smallest within this class. More specifically, let us define a selector $\delta_i(\beta) \in R^N$ as a vector whose entries are non-zero except for entries in $\beta$ corresponding to class i. We then compute the residual error for class i as $\|y - H\delta_i(\beta)\|_2$. The best class for y will be the class with the smallest residual error. Mathematically, the best class $i^*$ is defined as $$i^* = \min_i \|y - H\delta_i(\beta)\|_2 \quad (14)$$

Success on the sparse representation features depends on a suitable choice of dictionary H (step 204 in FIG. 2). Pooling together all training data from all classes into H will make the columns of H large (typically millions of frames), and will make solving for β intractable. Therefore, below we describe various methodologies to select H from a large sample set. Recall that H is selected for each frame y, and then β is found using ABCS, in order to create an Hβ feature for each frame.

Seeding H from Nearest Neighbors

For each y, we find a neighborhood of closest points to y in the training set. These k neighbors become the entries of H. In the kNN process, given a test vector y, the Euclidean distance between y and all points in the training data are computed. The k closest points in the training data with the smallest distance to y are chosen as the k nearest neighbors. A set of Hβ features is created for both training and test, but H is always seeded with data from training data. To avoid overtraining of Hβ features on the training set, we provide that only when creating Hβ features on training, samples be selected from training that are of a different speaker than the speaker corresponding to frame y.

By way of one example using a kNN approach, given a test vector y, the methodology finds the k-closest neighbors to this vector in the training set using a kd-tree. The k-closest neighbors from the training are concatenated into a sensitivity matrix as columns. The next step is associating with the test data and the sensitivity matrix an optimization problem for finding a sparse classifier that is a linear form on the sensitivity matrix and that moves the training data most closely to the test data subject to some predetermined degree of sparseness. The optimization problem is solved by finding the sparse classifier. A new feature space is created by mapping the sensitivity matrix into the feature space using the sparse classifier. Then the methodology includes training on the new feature space parameter models and applying decoding methods using these models.

While this kNN approach is computationally feasible on small-vocabulary tasks, using a kNN for large vocabulary tasks can be computationally expensive. To address this, we describe other embodiments for seeding H below, tailored to large vocabulary applications.

Using a Trigram Language Model

Ideally only a small subset of Gaussians are typically evaluated at a given frame, and thus training data belonging to this small subset can be used to seed H. To determine these Gaussians at each frame, we decode the data using a trigram language model (LM), and find the best aligned Gaussian (GMM) at each frame. For each Gaussian, we compute the four other closest Gaussians to this Gaussian. Here, closeness is defined by finding Gaussian pairs which have the smallest Euclidean distance between their means. After we find the top five Gaussians at a specific frame, we seed H with the training data aligning to these top five Gaussians. Since this still typically amounts to thousands of training samples in H, we sample this further. One preferred method for sampling is described below in "Choice of Sampling." We also compare seeding H using the top ten Gaussians rather than top five.

Using a Unigram Language Model

One issue with using a trigram language model (LM) is that seeding H with frames related to the top aligned Gaussian is essentially projecting y back down to the same Gaussian which initially identified it. Thus, to increase variability between the Gaussians used to seed H and the best aligned Gaussian from the trigram LM decode, in an alternative embodiment, we use a unigram LM to find the best aligned Gaussian at each frame. Again, given the best aligned Gaussian, the four closest Gaussians to this are found and data from these five Gaussians is used to seed H.

Using No Language Model Information

To further weaken the effect of the LM, in an alternative embodiment, we seed H using only acoustic information. Namely, at each frame, we find the top five scoring Gaussians. H is seeded with training data aligning to these Gaussians.

Enforcing Unique Phonemes

Another issue with seeding H by finding the five closest Gaussians relative to the best aligned Gaussian is that all of these Gaussians could come from the same phoneme (i.e., phoneme "AA"). Therefore, in an alternative embodiment, we find the five closest Gaussians relative to the best aligned such that the phoneme identities of these Gaussians are unique (i.e. "AA", "AE", "AW", etc.). H is then seeded by from frames aligning to these five Gaussians.

Using Gaussian Means

The above approaches of seeding H use actual examples from the training set, which is computationally expensive. To address this, in an alternative embodiment, we propose seeding H from Gaussian means. Namely, at each frame, we use a trigram LM to find the best aligned Gaussian. Then, we find the 499 closest Gaussians to this top Gaussian, and use the means from these 500 Gaussians to seed H.

We now describe two different embodiments for sampling a subset of this data to seed H.

Random Sampling

For each Gaussian from which we want to select training data, we propose randomly sampling N training examples from the total set of training frames that aligned to this Gaussian. This process is repeated for each of the closest five Gaussians. We reduce the size of N as the "closeness" decreases. For example, for the closest five Gaussians, the number of data points N chosen from each Gaussian is 200, 100, 100, 50 and 50 respectively.

Sampling Based on Cosine Similarity

While random sampling offers a relatively quick approach to select a subset of training examples, it does not necessarily guarantee that we select "good examples" from this Gaussian which actually are close to frame y. Alternatively, we propose splitting training points aligning to a Gaussian as being 1σ, 2σ, etc. away from the mean of the Gaussian. Here σ is chosen to be the total number of training points aligned to this Gaussian, divided by number of samples N we want to sample from this Gaussian. Then, within each σ set, we find the training point which has the closest cosine similarity to the test point y. This is repeated for all 1σ, 2σ, etc. values. Again, the number of samples taken from each Gaussian reduces as "closeness" decreases.

As will be appreciated by one skilled in the art, aspects of the present invention may be embodied as a system, apparatus, method or computer program product. Accordingly, aspects of the present invention may take the of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list)

of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring again to FIGS. 1A, 1B, and 2, the diagrams in the figures illustrate the architecture, functionality, and operation of possible implementations of systems, methods and computer program products according to various embodiments of the present invention. In this regard, each block in a flowchart or a block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagram and/or flowchart illustration, and combinations of blocks in the block diagram and/or flowchart illustration, can be implemented by special purpose hardware-based systems that perform the specified functions or acts, or combinations of special purpose hardware and computer instructions.

Accordingly, techniques of the invention, for example, as depicted in FIGS. 1A, 1B, and 2, can also include, as described herein, providing a system, wherein the system includes distinct modules (e.g., modules comprising software, hardware or software and hardware). By way of example only, the modules may include, but are not limited to, a sparse representation training engine module, a speech utterance pre-processor module, a feature extractor module, a speech recognition engine module, and an acoustic model storage module. These and other modules may be configured, for example, to perform the steps described and illustrated in the context of FIGS. 1A, 1B, and 2.

Figure 3:
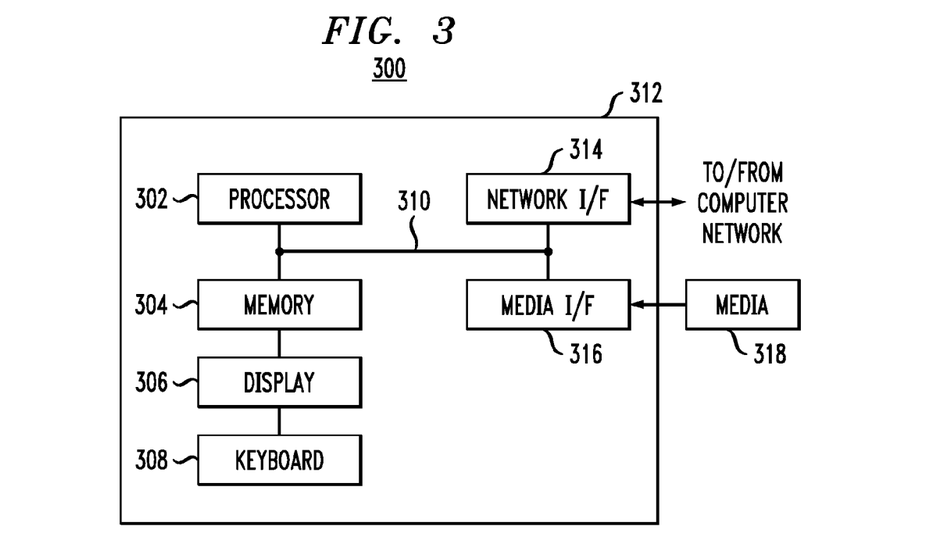
FIG. 3 illustrates a computer system for implementing one or more steps and/or components in accordance with one or more embodiments of the invention.

One or more embodiments can make use of software running on a general purpose computer or workstation. With reference to FIG. 3, such an implementation 300 employs, for example, a processor 302, a memory 304, and an input/output interface formed, for example, by a display 306 and a keyboard 308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, keyboard or mouse), and one or more mechanisms for providing results associated with the processing unit (for example, display or printer).

The processor 302, memory 304, and input/output interface such as display 306 and keyboard 308 can be interconnected, for example, via bus 310 as part of a data processing unit 312. Suitable interconnections, for example, via bus 310, can also be provided to a network interface 314, such as a network card, which can be provided to interface with a computer network, and to a media interface 316, such as a diskette or CD-ROM drive, which can be provided to interface with media 318.

A data processing system suitable for storing and/or executing program code can include at least one processor 302 coupled directly or indirectly to memory elements 304 through a system bus 310. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboard 308, display 306, pointing device, microphone, and the like) can be coupled to the system either directly (such as via bus 310) or through intervening I/O controllers (omitted for clarity).

Network adapters such as network interface 314 may also be coupled to the system to enable the data processing system to become coupled to other data processing systems or remote printers or storage devices through intervening private or public networks. Modems, cable modem and Ethernet cards are just a few of the currently available types of network adapters.

As used herein, a "server" includes a physical data processing system (for example, system 312 as shown in FIG. 3) running a server program. It will be understood that such a physical server may or may not include a display and keyboard.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method, comprising:
   obtaining a test vector and a training data set associated with a speech recognition system;
   selecting a subset of the training data set;
   mapping the test vector with the selected subset of the training data set as a linear combination that is weighted by a sparseness constraint such that a new test feature set is formed wherein the training data set is moved more closely to the test vector subject to the sparseness constraint; and
   training, using a processor, an acoustic model on the new test feature set.

2. The method of claim 1, further comprising using the acoustic model trained on the new test feature set to decode user speech input to the speech recognition system.

3. The method of claim 1, wherein the selecting step further comprises selecting the subset of the training data set as the k nearest neighbors to the test vector in the training data set.

4. The method of claim 1, wherein the selecting step further comprises selecting the subset of the training data set based on a trigram language model.

5. The method of claim 1, wherein the selecting step further comprises selecting the subset of the training data set based on a unigram language model.

6. The method of claim 1, wherein the selecting step further comprises selecting the subset of the training data set based on only acoustic information.

7. The method of claim 6, wherein the acoustic information selecting step further comprises using acoustic information with unique phoneme identities.

8. The method of claim 6, wherein the acoustic information comprises a given number of top scoring Gaussian Mixture Models.

9. The method of claim 1, wherein the selecting step further comprises selecting the subset of the training data set based on Gaussian means.

10. The method of claim 1, wherein the selecting step further comprises selecting the subset of the training data set based on random sampling.

11. The method of claim 1, wherein the selecting step further comprises selecting the subset of the training data set based on cosine similarity sampling.

12. The method of claim 1, wherein the mapping step further comprises solving an equation $y=H\beta$ where y is the test vector, H is the selected subset of the training data set, and $\beta$ is the sparseness constraint value.

13. The method of claim 12, wherein $\beta$ is computed using an approximate Bayesian compressive sensing method.

14. An apparatus, comprising:
   a memory; and
   a processor operatively coupled to the memory and configured to:
   obtain a test vector and a training data set associated with a speech recognition system;
   select a subset of the training data set;
   map the test vector with the selected subset of the training data set as a linear combination that is weighted by a sparseness constraint such that a new test feature set is formed wherein the training data set is moved more closely to the test vector subject to the sparseness constraint; and
   train an acoustic model on the new test feature set.

15. The apparatus of claim 14, wherein the processor is further configured to use the acoustic model trained on the new test feature set to decode user speech input to the speech recognition system.

16. The apparatus of claim 14, wherein the selecting step further comprises selecting the subset of the training data set as the k nearest neighbors to the test vector in the training data set.

17. The apparatus of claim 14, wherein the selecting step further comprises selecting the subset of the training data set based on a trigram language model.

18. The apparatus of claim 14, wherein the selecting step further comprises selecting the subset of the training data set based on a unigram language model.

19. The apparatus of claim 14, wherein the selecting step further comprises selecting the subset of the training data set based on only acoustic information.

20. The apparatus of claim 14, wherein the selecting step further comprises selecting the subset of the training data set based on Gaussian means.

21. The apparatus of claim 14, wherein the selecting step further comprises selecting the subset of the training data set based on random sampling.

22. The apparatus of claim 14, wherein the selecting step further comprises selecting the subset of the training data set based on cosine similarity sampling.

23. The apparatus of claim 14, wherein the mapping step further comprises solving an equation $y=H\beta$ where y is the test vector, H is the selected subset of the training data set, and $\beta$ is the sparseness constraint value.

24. The apparatus of claim 23, wherein $\beta$ is computed using an approximate Bayesian compressive sensing method.

25. A non-transitory computer readable storage medium having tangibly embodied thereon computer readable program code which, when executed, causes a processor device to:
   obtain a test vector and a training data set associated with a speech recognition system;
   select a subset of the training data set;
   map the test vector with the selected subset of the training data set as a linear combination that is weighted by a sparseness constraint such that a new test feature set is formed wherein the training data set is moved more closely to the test vector subject to the sparseness constraint; and
   train an acoustic model on the new test feature set.

* * * * *